United States Patent
Ikeda

(10) Patent No.: US 8,703,871 B2
(45) Date of Patent: Apr. 22, 2014

(54) POLYOLEFIN RESIN COMPOSITION AND MOLDED ARTICLE CONTAINING THE SAME

(71) Applicant: Sumitomo Chemical Company, Limited, Tokyo (JP)

(72) Inventor: Kenji Ikeda, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/871,493

(22) Filed: Apr. 26, 2013

(65) Prior Publication Data

US 2013/0289212 A1 Oct. 31, 2013

(30) Foreign Application Priority Data

Apr. 27, 2012 (JP) ................. 2012-102450

(51) Int. Cl.
- *C08F 8/00* (2006.01)
- *C08L 23/04* (2006.01)
- *C08L 23/10* (2006.01)
- *C08L 23/14* (2006.01)
- *C08L 23/08* (2006.01)
- *C08L 23/06* (2006.01)

(52) U.S. Cl.
CPC ............ *C08L 23/14* (2013.01); *C08L 23/0807* (2013.01); *C08L 23/06* (2013.01); *C08L 2205/025* (2013.01); *C08L 2314/00* (2013.01)
USPC .......................................... 525/191; 525/240

(58) Field of Classification Search
CPC ..... C08L 23/14; C08L 23/0807; C08L 23/06; C08L 2205/025; C08L 2314/00
USPC .................................................. 525/191, 240
See application file for complete search history.

(56) References Cited

U.S. PATENT DOCUMENTS 4,960,823 A 10/1990 Komatsu et al.
7,217,767 B2 * 5/2007 Aguirre et al. ................ 525/191

FOREIGN PATENT DOCUMENTS

JP H07-033919 A 2/1995

* cited by examiner

*Primary Examiner* — Nathan M Nutter
(74) *Attorney, Agent, or Firm* — Panitch Schwarze Belisario & Nadel LLP

(57) ABSTRACT

There is provided a polyolefin resin composition capable of affording molded articles being superior in tensile elongation at break and impact resistance. The composition includes not less than 1 wt % and less than 80 wt % of a propylene polymer (I) that is a propylene homopolymer or a copolymer of propylene and at least one comonomer, the copolymer having more than 0 wt % and less than 20 wt % of structural units derived from the at least one comonomer, not less than 1 wt % and less than 80 wt % of a propylene copolymer (II) having 20 to 80 wt % of structural units derived from the comonomer and/or an ethylene copolymer (III) having a density of less than 940 kg/m$^3$, and more than 20 wt % and not more than 98 wt % of an ethylene polymer (IV) having an MFR of 12 to 100 g/10 minutes and a density of 940 to 970 kg/m$^3$.

4 Claims, No Drawings

POLYOLEFIN RESIN COMPOSITION AND MOLDED ARTICLE CONTAINING THE SAME

BACKGROUND OF THE INVENTION

1. Field of the Invention

The present invention relates to a polyolefin resin composition capable of affording a molded article being superior in tensile elongation at break and impact resistance, and a molded article comprising the same.

2. Description of Related Art

Polyolefins are used widely as automotive components such as automotive interior or exterior products because of their superior appearance and mechanical properties.

For example, U.S. Pat. No. 4,960,823 discloses a resin composition comprising 50 to 65 parts by weight of a propylene-ethylene block copolymer component having specific properties, 40 to 25 parts by weight of an ethylene-propylene-diene terpolymer rubber having specific properties, and 10 to 15 parts by weight of a high density polyethylene having specific properties in order to improve the flexural modulus, IZOD impact strength, the amount of adsorption of solvents, coatability, appearance, surface gloss, and so on. JP 7-33919 A discloses a polypropylene resin composition comprising a highly crystalline propylene homopolymer having specific properties, an ethylene component-containing elastomer having specific properties or a styrene component-containing hydrogenated block copolymer, and talc in order to improve moldability, appearance, flexural modulus, and mechanical strength such as impact resistance.

In view of recent reduction in thickness, increase in functionality, and increase in size of automotive components, the resin compositions and molded articles thereof disclosed in the above-cited documents have been required to be further improved in tensile elongation at break and impact resistance.

SUMMARY OF THE INVENTION

The object of the present invention is to provide a polyolefin resin molded article being superior in tensile elongation at break and impact resistance, and a polyolefin resin composition capable of affording such a molded article.

The present invention relates to a polyolefin resin composition comprising not less than 1% by weight and less than 80% by weight of a propylene polymer (I) defined below, not less than 1% by weight and less than 80% by weight of a propylene copolymer (II) defined below and/or an ethylene copolymer (III) defined below, and more than 20% by weight and not more than 98% by weight of an ethylene polymer (IV) defined below, wherein the ratio of the content of the ethylene polymer (IV) to the sum total of the contents of the propylene copolymer (II) and the ethylene copolymer (III) is within the range of from 0.25 to 98 with the proviso that the combined amount of the propylene polymer (I), the propylene copolymer (II), the ethylene copolymer (III) and the ethylene polymer (IV) is taken as 100% by weight.

Herein, the propylene polymer (I) is a propylene homopolymer or a copolymer of propylene and at least one comonomer selected from the group consisting of ethylene and α-olefins having 4 to 10 carbon atoms, the copolymer having more than 0% by weight and less than 20% by weight of structural units derived from the at least one comonomer, with the proviso that the overall weight of the polymer (I) is taken as 100% by weight.

The propylene copolymer (II) is a copolymer of propylene and at least one comonomer selected from the group consisting of ethylene and α-olefins having 4 to 10 carbon atoms, the copolymer having 20 to 80% by weight of structural units derived from the comonomer with the proviso that the overall weight of the copolymer (II) is taken as 100% by weight.

The ethylene copolymer (III) is a copolymer of ethylene and an α-olefin having 4 to 10 carbon atoms, the copolymer having a density of less than 940 kg/m$^3$.

The ethylene polymer (IV) is a polyethylene having a melt flow rate measured at 190° C. and a load of 21.18 N of 12 to 100 g/10 minutes and a density of 940 to 970 kg/m$^3$, excluding an ethylene-propylene copolymer.

The present invention also relates to a molded article comprising the above-described polyolefin resin composition.

EFFECTS OF THE INVENTION

The present invention can afford a polyolefin-based molded article being superior in tensile elongation at break and impact resistance. Polyolefin resin molded articles afforded by the present invention generally contain volatile organic compound components in a lower content.

DESCRIPTION OF PREFERRED EMBODIMENTS

The polyolefin resin composition of the present invention comprises not less than 1% by weight and less than 80% by weight of a propylene polymer (I) defined below, not less than 1% by weight and less than 80% by weight of a propylene copolymer (II) defined below and/or an ethylene copolymer (III) defined below, and more than 20% by weight and not more than 98% by weight of an ethylene polymer (IV) defined below, wherein the ratio of the content of the ethylene polymer (IV) to the sum total of the contents of the propylene copolymer (II) and the ethylene copolymer (III) is within the range of from 0.25 to 98 with the proviso that the combined amount of the propylene polymer (I), the propylene copolymer (II), the ethylene copolymer (III) and the ethylene polymer (IV) is taken as 100% by weight.

Herein, the propylene polymer (I) is a propylene homopolymer or a copolymer of propylene and at least one comonomer selected from the group consisting of ethylene and α-olefins having 4 to 10 carbon atoms, the copolymer having more than 0% by weight and less than 20% by weight of structural units derived from the at least one comonomer, with the proviso that the overall weight of the polymer (I) is taken as 100% by weight.

The propylene copolymer (II) is a copolymer of propylene and at least one comonomer selected from the group consisting of ethylene and α-olefins having 4 to 10 carbon atoms, the copolymer having 20 to 80% by weight of structural units derived from the comonomer, with the proviso that the overall weight of the copolymer (II) is taken as 100% by weight.

The ethylene copolymer (III) is a copolymer of ethylene and an α-olefin having 4 to 10 carbon atoms, the copolymer having a density of less than 940 kg/m$^3$.

The ethylene polymer (IV) is a polyethylene having a melt flow rate measured at 190° C. and a load of 21.18 N of 12 to 100 g/10 minutes and a density of 940 to 970 kg/m$^3$, excluding an ethylene-propylene copolymer.

The propylene (I) to be used for the present invention is a propylene homopolymer or a copolymer of propylene and at least one comonomer selected from the group consisting of ethylene and α-olefins having 4 to 10 carbon atoms, the copolymer having more than 0% by weight and less than 20% by weight of structural units derived from the at least one comonomer with the proviso that the overall weight of the polymer is taken as 100% by weight, and examples thereof include propylene homopolymers and propylene copolymers having structural units derived from at least one comonomer selected from the group consisting of ethylene and α-olefins having 4 to 10 carbon atoms and structural units derived from propylene.

In the event that the propylene polymer (I) is a propylene copolymer mentioned above, the content of structural units derived from at least one comonomer selected from the group consisting of ethylene and α-olefins having 4 to 10 carbon atoms is preferably not less than 0.01% by weight and less than 20% by weight with the proviso that the overall weight of the polymer (I) is taken as 100% by weight.

The α-olefin having 4 to 10 carbon atoms to be selected is preferably 1-butene, 1-hexene, or 1-octene, and more preferably is 1-butene.

Examples of the propylene copolymer mentioned above as the propylene polymer (I) include propylene-ethylene copolymers, propylene-1-butene copolymers, propylene-1-hexene copolymers, propylene-1-octene copolymers, propylene-ethylene-1-butene copolymers, propylene-ethylene-1-hexene copolymers, and propylene-ethylene-1-octene copolymers.

The propylene polymer (I) is preferably a propylene homopolymer, a propylene-ethylene copolymer, a propylene-1-butene copolymer, or a propylene-ethylene-1-butene copolymer, and more preferably is a propylene homopolymer.

The propylene copolymer (II) to be used for the present invention is a copolymer of propylene and at least one comonomer selected from the group consisting of ethylene and α-olefins having 4 to 10 carbon atoms, the copolymer having 20 to 80% by weight of structural units derived from the comonomer with the proviso that the overall weight of the copolymer (II) is taken as 100% by weight. The propylene copolymer (II) may be either a copolymer produced by one-stage polymerization or, for example, a copolymer produced in any stage in multi-stage polymerization.

The content of structural units derived from at least one comonomer selected from the group consisting of ethylene and α-olefins having 4 to 10 carbon atoms is 20 to 80% by weight, preferably 20 to 70% by weight, and more preferably 25 to 65% by weight with the proviso that the overall weight of the copolymer (II) is taken as 100% by weight. If the content of the structural units derived from the comonomer is less than 20% by weight, the impact resistance of a resulting molded article may not be sufficiently high, whereas if the content exceeds 80% by weight, the tensile elongation at break of a resulting molded article may not be sufficiently high.

Examples of the α-olefin having 4 to 10 carbon atoms to constitute the propylene copolymer (II) include α-olefins the same as the α-olefins having 4 to 10 carbon atoms to constitute the above-described propylene polymer (I).

Examples of the propylene copolymer (II) include propylene-ethylene copolymers, propylene-ethylene-1-butene copolymers, propylene-ethylene-1-hexene copolymers, propylene-ethylene-1-octene copolymers, propylene-ethylene-1-decene copolymers, propylene-1-butene copolymers, propylene-1-hexene copolymers, propylene-1-octene copolymers, and propylene-1-decene copolymers, and preferably include propylene-ethylene copolymer, propylene-1-butene copolymers, propylene-ethylene-1-butene copolymers, propylene-1-hexene copolymers, and propylene-1-octene copolymers.

A polymeric material obtained via a process in which a propylene polymer (I) and a propylene copolymer (II) are produced by multi-stage polymerization is preferred, and more preferred is a polymeric material obtained via a process in which a propylene polymer (I) and a propylene copolymer (II) is obtained as a whole by multi-stage polymerization in which the polymer (I) is produced first, and then the copolymer (II) is produced. In the event that the propylene polymer (I) is a propylene homopolymer, examples of the polymeric material include (propylene)-(propylene-ethylene) copolymerized materials, (propylene)-(propylene-ethylene-1-butene) copolymerized materials, (propylene)-(propylene-ethylene-1-hexene) copolymerized materials, (propylene)-(propylene-ethylene-1-octene) copolymerized materials, (propylene)-(propylene-1-butene) copolymerized materials, (propylene)-(propylene-1-hexene) copolymerized materials, (propylene)-(propylene-1-octene) copolymerized materials, and (propylene)-(propylene-1-decene) copolymerized materials.

In the event that the propylene polymer (I) is the propylene copolymer described above, examples of the polymeric material mentioned above include (propylene-ethylene)-(propylene-ethylene) copolymerized materials, (propylene-ethylene)-(propylene-ethylene-1-butene) copolymerized materials, (propylene-ethylene)-(propylene-ethylene-1-hexene) copolymerized materials, (propylene-ethylene)-(propylene-ethylene-1-octene) copolymerized materials, (propylene-ethylene)-(propylene-ethylene-1-decene) copolymerized materials, (propylene-ethylene)-(propylene-1-butene) copolymerized materials, (propylene-ethylene)-(propylene-1-hexene) copolymerized materials, (propylene-ethylene)-(propylene-1-octene) copolymerized materials, (propylene-ethylene)-(propylene-1-decene) copolymerized materials, (propylene-1-butene)-(propylene-ethylene) copolymerized materials, (propylene-1-butene)-(propylene-ethylene-1-butene) copolymerized materials, (propylene-1-butene)-(propylene-ethylene-1-hexene) copolymerized materials, (propylene-1-butene)-(propylene-ethylene-1-octene) copolymerized materials, (propylene-1-butene)-(propylene-ethylene-1-decene) copolymerized materials, (propylene-1-butene)-(propylene-1-butene) copolymerized materials, (propylene-1-butene)-(propylene-1-hexene) copolymerized materials, (propylene-1-butene)-(propylene-1-octene) copolymerized materials, (propylene-1-butene)-(propylene-1-decene) copolymerized materials, (propylene-1-hexene)-(propylene-1-hexene) copolymerized materials, (propylene-1-hexene)-(propylene-1-octene) copolymerized materials, (propylene-1-hexene)-(propylene-1-decene) copolymerized materials, (propylene-1-octene)-(propylene-1-octene) copolymerized materials, and (propylene-1-octene)-(propylene-1-decene) copolymerized materials.

In the case of a polymeric material obtained via a process in which a propylene polymer (I) and a propylene copolymer (II) are produced by multi-stage polymerization, the polymeric material is preferably a (propylene)-(propylene-ethylene) copolymerized material, a (propylene)-(propylene-ethylene-1-butene) copolymerized material, a (propylene-ethylene)-(propylene-ethylene) copolymerized material, a (propylene-ethylene)-(propylene-ethylene-1-butene) copolymerized material, or a (propylene-1-butene)-(propylene-1-butene) copolymerized material, and more preferably is a (propylene)-(propylene-ethylene) copolymerized material.

From the viewpoint of the flowability of a composition and the tensile elongation at break and the volatile organic compound component content of a molded article, the intrinsic viscosity of the propylene polymer (I) measured in Tetralin of 135° C. (hereinafter referred to as "$[\eta]_I$") is preferably 0.5 to 1.8 dL/g, more preferably 0.6 to 1.6 dL/g, and even more preferably 0.7 to 1.5 dL/g.

From the viewpoint of the tensile elongation at break and the impact resistance of a molded article, the intrinsic viscosity of the propylene copolymer (II) measured in Tetralin of 135° C. (hereinafter referred to as "$[\eta]_{II}$") is preferably 2.0 to 8.0 dL/g, more preferably 2.2 to 7.5 dL/g, and even more preferably 2.5 to 7.0 dL/g.

The intrinsic viscosity (unit: dL/g) used in the present invention is measured using tetralin as a solvent at a temperature of 135° C. by the method described below. Reduced viscosities are measured at three concentrations of 0.1 g/dL, 0.2 g/dL and 0.5 g/dL with an Ubbelohde viscometer. The intrinsic viscosity is calculated by the method described in "Kobunshi Yoeki (Polymer Solution), Kobunshi Jikkengaku (Polymer Experiment Study) Vol. 11" page 491 (published by Kyoritsu Shuppan Co., Ltd., 1982), namely, by an extrapolation method in which reduced viscosities are plotted against concentrations and the concentration is extrapolated to zero.

In the case of a polymeric material obtained via a process in which a propylene polymer (I) and a propylene copolymer (II) are obtained as a whole by multi-stage polymerization, the intrinsic viscosity of a polymer partly extracted from the polymerization vessel of an earlier stage (namely, a propylene polymer (I) or a propylene copolymer (II)) is measured first, and then the intrinsic viscosity of a polymer produced in a later stage is calculated using the intrinsic viscosity measured previously and the contents of the polymers contained in the polymeric material eventually obtained via the polymerization of the later stage.

In the case of a copolymeric material produced by a method in which a propylene polymer (I) and a propylene copolymer (II) as a whole are obtained via a process in which the propylene polymer (I) is obtained in a polymerization step of an earlier stage and the propylene copolymer (II) is obtained in a later step, the procedures of the measurement and the calculation of the contents of the propylene polymer (I) and the propylene copolymer (II) and intrinsic viscosities ($[\eta]_T$, $[\eta]_I$, $[\eta]_{II}$) are as follows. The intrinsic viscosity ($[\eta]_T$) indicates the intrinsic viscosity of the propylene polymer (I) and the propylene copolymer (II) as a whole.

From the intrinsic viscosity of the propylene polymer (I) obtained by the polymerization step of the earlier stage ($[\eta]_I$), the intrinsic viscosity of the final polymer after the polymerization step of the later stage (the whole of the propylene polymer (I) and the propylene copolymer (II)) measured by the above-described method ($[\eta]_T$), and the content of the propylene copolymer (II) contained in the final polymeric material, the intrinsic viscosity of the propylene copolymer (II) $[\eta]_{II}$ is calculated from the following formula:

$$[\eta]_{II}=([\eta]_T-[\eta]_I \times X_I)/X_{II}$$

$[\eta]_T$: the intrinsic viscosity (dL/g) of the final polymeric material after the polymerization step of the later stage $[\eta]_I$: the intrinsic viscosity (dL/g) of a polymer powder extracted from the polymerization reactor after the polymerization step of the earlier stage $X_I$: the ratio of the weight of the propylene polymer (I) to the total weight of the propylene polymer (I) and the propylene copolymer (II)

$X_{II}$: the ratio of the weight of the propylene copolymer (II) to the total weight of the propylene polymer (I) and the propylene copolymer (II)

$X_I$ and $X_{II}$ are calculated from the mass balance in the polymerizations.

The content (% by weight) ($(C\alpha')_{II}$) of the structural units derived from the comonomer of the propylene copolymer (II) is determined by measuring the content (% by weight) ($(C\alpha')_T$) of the units derived from the comonomer of the whole of the propylene polymer (I) and the propylene copolymer (II) by the infrared absorption spectrum method, and then calculating ($(C\alpha')_{II}$) using the following formula.

$$(C\alpha')_{II}=(C\alpha')_T/X_{II}$$

$(C\alpha')_T$: the content (% by weight) of the units derived from the comonomer of the whole of the propylene polymer (I) and the propylene copolymer (II)

$(C\alpha')_{II}$: the content (% by weight) of the structural units derived from the comonomer of the propylene copolymer (II)

The propylene polymer (I) and the propylene copolymer (II) each can be produced a conventional polymerization catalyst and using a conventional polymerization method. Examples of a polymerization catalyst that can be used include polymerization catalysts including Ziegler type catalyst systems, Ziegler-Natta type catalyst systems, catalyst systems composed of an alkyl aluminoxane and a Group 4 transition metal compound having a cyclopentadienyl ring, catalyst systems composed of an organoaluminum compound, a Group 4 transition metal compound having a cyclopentadienyl ring, and a compound capable of reacting with the transition metal compound to form an ionic complex; preliminarily polymerized catalysts prepared by preliminarily polymerizing ethylene or an α-olefin in the presence of the above-described catalyst systems may also be used. Examples of these catalyst systems include the catalyst systems disclosed in JP-A-61-218606, JP-A-61-287904, JP-A-5-194685, JP-A-7-216017, JP-A-9-316147, JP-A-10-212319, and JP-A-2004-182981.

Examples of a polymerization method that can be used include bulk polymerization, solution polymerization, slurry polymerization, and gas phase polymerization. Bulk polymerization is a method by which polymerization is carried out using, as a medium, an olefin which is liquid at the polymerization temperature. The solution polymerization (the slurry polymerization is the same in definition) is a method by which polymerization is carried out in an inert hydrocarbon solvent such as propane, butane, isobutane, pentane, hexane, heptane, and octane. The gas phase polymerization is a method in which a gaseous monomer is used as a medium and a gaseous monomer is polymerized in the medium. Such polymerization methods may be carried out either in a batch system or in a continuous system and a plurality of polymerization methods may be combined appropriately. From the industrial and economical point of view, a production method by a continuous gas phase polymerization method or by a bulk-gas phase polymerization method in which a bulk polymerization method and a gas phase polymerization method are used continuously is preferred.

The method for producing the propylene polymer (I) and the propylene copolymer (II) may be either a method in which the propylene polymer (I) and the propylene copolymer (II) are produced in a single stage or a method in which the propylene polymer (I) and the propylene copolymer (II) are produced in two or more stages. Examples of such a multi-stage production method include the production methods by multi-stage polymerization disclosed in JP-A-5-194685 and JP-A-2002-12719. The conditions of each polymerization step (namely, polymerization temperature, polymerization pressure, monomer concentration, amount of catalyst to be charged, polymerization time, etc.) may be varied and determined appropriately depending on the intrinsic viscosities and the contents of the desired propylene polymer (I) and the desired propylene copolymer (II), the comonomer content of the copolymer, etc. In order to remove residual solvents in the propylene polymer (I) and the propylene copolymer, and oligomers by-produced during the production of the polymer and the copolymer, drying may be performed at a temperature at which the propylene polymer (I) does not melt. Examples of a drying method include the methods disclosed in JP-A-55-75410 and the publication of Japanese Patent No. 2565753.

The ethylene copolymer (III) to be used for the present invention is a copolymer of ethylene and an α-olefin having 4 to 10 carbon atoms, the copolymer having a density of less than 940 kg/m'. The density of the ethylene copolymer (III) is preferably 550 to 930 kg/m$^3$, more preferably 850 to 900 kg/m$^3$, even more preferably 850 to 880 kg/m$^3$, and most preferably 855 to 875 kg/m$^3$. When the density is 940 kg/m$^3$ or more, a molded article may be inferior in elongation at break or impact resistance. The density is measured in accordance with Method A provided in JIS K7112-1980 after doing the annealing disclosed in JIS K6760-1995.

The ethylene copolymer (III) preferably has a melt flow rate, which is measured at 190° C. and a load of 21.18 N in accordance with JIS K7210, of 0.01 to 200 g/10 minutes, more preferably 0.05 to 100 g/10 minutes, and even more preferably 0.1 to 80 g/10 minutes.

Examples of the α-olefin having 4 to 10 carbon atoms that is a constituent of the ethylene copolymer (III) include 1-butene, 1-pentene, 1-hexene, 4-methyl-1-heptene, 1-octene, 1-decene, and α-olefins having a cyclic structure; 1-butene, 1-hexene or 1-octene is preferred.

Specific examples of the ethylene copolymer (III) include ethylene-1-butene copolymers, ethylene-1-hexene copolymers, ethylene-1-octene copolymers, ethylene-1-decene copolymers, ethylene-(3-methyl-1-butene) copolymers, and copolymers of ethylene and an α-olefin having a cyclic structure.

The content of the structural units derived from an α-olefin having 4 to 10 carbon atoms contained in the ethylene copolymer (III) is preferably 1 to 49% by weight, more preferably 5 to 49% by weight, and even more preferably 10 to 49% by weight, with the proviso that the overall weight of the copolymer (III) is taken as 100% by weight.

The ethylene copolymer (III) can be produced by polymerizing monomers using a polymerization catalyst.

Examples of the polymerization catalyst include metallocene catalyst systems and Ziegler-Natta type catalyst systems.

Examples of the metallocene catalyst system include catalyst systems composed of an alkyl aluminoxane and a Group 4 transition metal compound having a cyclopentadienyl ring, catalyst systems composed of an organoaluminum compound, a Group 4 transition metal compound having a cyclopentadienyl ring, and a compound capable of reacting with the transition metal compound to form an ionic complex, and catalyst systems prepared by supporting catalyst components such as a Group 4 transition metal compound having a cyclopentadienyl ring, a compound capable of forming an ionic complex, and an organoaluminum compound on inorganic particles such as silica and clay mineral. Moreover, it is also possible to produce a copolymer of ethylene and an α-olefin having 4 to 10 carbon atoms by performing polymerization using a prepolymerized catalyst prepared by preliminarily polymerizing ethylene or an α-olefin in the presence of a catalyst system mentioned above.

Examples of the Ziegler-Natta type catalyst system include a catalyst system comprising a combination of a titanium-containing solid transition metal component and an organic metal component.

The ethylene polymer (IV) to be used for the present invention is a polyethylene having a density of 940 to 970 kg/m$^3$ (so-called high density polyethylene) having a melt flow rate measured at 190° C. and a load of 21.18 N of 12 to 100 g/10 minutes, excluding an ethylene-propylene copolymer. The melt flow rate of the ethylene polymer (IV) measured at 190° C. and a load of 21.18 N is preferably 12 to 90 g/10 minutes, more preferably 12 to 80 g/10 minutes, and even more preferably 15 to 70 g/10 minutes. The melt flow rate is measured in accordance with JIS K7210. When the melt flow rate is less than 12 g/10 minutes, the flowability of a composition may be excessively low and a molded article may be inferior in appearance, whereas when the melt flow rate exceeds 100 g/10 minutes, a molded article may be inferior in elongation at break or impact resistance.

The density of the ethylene polymer (IV) is preferably 945 to 970 kg/m$^3$, and more preferably 950 to 965 kg/m$^3$. When the density is less than 940 kg/m$^3$ or when it exceeds 970 kg/m$^3$, a molded article may be inferior in elongation at break or impact resistance. The density is measured in accordance with Method A provided in JIS K7112-1980 after doing the annealing disclosed in JIS K6760-1995.

The ethylene polymer (IV) is an ethylene homopolymer or an ethylene-α-olefin copolymer in which an α-olefin has been copolymerized so as to achieve a density of 940 to 970 kg/m$^3$. Examples of preferable ethylene-α-olefin copolymers include ethylene-butene-1 copolymers, ethylene-hexene-1 copolymers, ethylene-octene-1 copolymers, and ethylene-4-methyl-pentene-1 copolymers. These may be used singly or two or more of them may be used in combination.

The ethylene polymer (IV) can be produced using a conventional method; for example, a method using a catalyst containing a transition metal atom can be used.

Examples of the catalyst containing a transition metal atom include a transition metal compound, a composition composed of a transition metal compound and an activator, and a composition composed of a transition metal compound, an activator, and a carrier.

Examples of the transition metal compound include compounds containing a transition metal of Group 3 to 11 of the periodic table or of a lanthanoid series, a halogen atom, and a group having a cyclopentadiene type anion skeleton or a group containing a hetero atom. When there are two or more of the aforementioned group, they may be either identical or different. Groups having a cyclopentadiene type anion skeleton, or a group having a cyclopentadiene type anion skeleton and a group containing a hetero atom, or groups containing a hetero atom may be linked together directly or also may be linked via a residue containing a carbon atom, a silicon atom, a nitrogen atom, an oxygen atom, a sulfur atom, or a phosphorus atom.

Examples of the transition metal atom include a scandium atom, a yttrium atom, a titanium atom, a zirconium atom, a hafnium atom, a vanadium atom, a niobium atom, a tantalum atom, a chromium atom, an iron atom, a ruthenium atom, a cobalt atom, a rhodium atom, a nickel atom, a palladium atom, a samarium atom, and a ytterbium atom.

Examples of the group having a cyclopentadiene type anion skeleton include an optionally substituted cyclopentadienyl group, an optionally substituted indenyl group, an optionally substituted hydroindenyl group, and an optionally substituted fluorenyl group.

Examples of the hetero atom in the group containing a hetero atom include an oxygen atom, a sulfur atom, a nitrogen atom, and a phosphorus atom, and examples of such a group include alkoxy groups, aryloxy groups, thioalkoxy groups, thioaryloxy groups, an amino group, an imino group, a phosphino group, chelatable ligands, and aromatic or aliphatic heterocyclic groups having a hetero atom in the ring.

The activator may be any substance capable of activating the transition metal compound to form an ion pair, and examples thereof include organoaluminum compounds, organoaluminum oxy compounds, boron compounds, clay minerals, sulfonic acid salts, carboxylic acid derivatives, and surface-treated solid oxides or solid halides. These compounds may be used in a combination of two or more of them.

Examples of the above-mentioned carrier include inorganic substances such as inorganic oxides, clay and clay minerals, and particulate organic polymers. Examples of the inorganic oxides include $SiO_2$, $Al_2O_3$, $MgO$, $ZrO_2$, $TiO_2$, $B_2O_3$, $CaO$, $ZnO$, $BaO$, $ThO_2$, and mixtures thereof. Examples of the clays or clay minerals include kaolin, bentonite, kibushi clay, Gairome clay, allophane, hisingerite, pyrophyllite, talc, a mica group, a montmorillonite group, vermiculite, a chlorite group, palygorskite, kaolinite, nacrite, dickite, and halloysite. As to the carrier, there can be used one having been subjected to surface treatment or chemical treatment as required.

Other examples of the catalyst containing a transition metal atom include so-called Ziegler-Natta catalysts, which are composed of a solid catalyst component prepared using a Group 4 to 6 transition metal compound, and an organometal compound of a Group 1, 2 or 13 metal.

Examples of the method of producing the ethylene polymer (IV) include slurry polymerization, gas phase polymerization, and solution polymerization in each of which is used the above-mentioned catalyst containing a transition metal atom, and polymerization conditions, such as polymerization temperature, polymerization time, polymerization pressure, and monomer concentration, are not particularly limited. Additional ingredients such as a surfactant, an antistatic agent, and an electron donating compound are allowed to be present in the polymerization reaction system as required.

The polyolefin resin composition of the present invention comprises not less than 1% by weight and less than 80% by weight of the propylene polymer (I), not less than 1% by weight and less than 80% by weight of the propylene copolymer (II) and/or the ethylene copolymer (III), and more than 20% by weight and not more than 98% by weight of the ethylene polymer (IV) with the proviso that the combined amount of the propylene polymer (I), the propylene copolymer (II), the ethylene copolymer (III), and the ethylene polymer (IV) is taken as 100% by weight. It is preferable that the polyolefin resin composition comprises 3 to 75% by weight of the propylene polymer (I), 3 to 75% by weight of the propylene copolymer (II) and/or the ethylene copolymer (III), and 25 to 94% by weight of the ethylene polymer (IV), and it is more preferable that the composition comprises 4 to 70% by weight of the propylene polymer (I), 4 to 70% by weight of the propylene copolymer (II) and/or the ethylene copolymer (III), and 30 to 92% by weight of the ethylene polymer (IV). If the content of the ethylene polymer (IV) is 20% by weight or less, then molded articles may be inferior in tensile elongation at break or impact resistance and volatile organic compound components may increase, whereas if the content of the ethylene polymer (IV) exceeds 98% by weight, molded articles may be inferior in tensile elongation at break.

In the polyolefin resin composition of the present invention, the ratio of the content of the ethylene polymer (IV) to the total of the contents of the propylene copolymer (I) and the ethylene copolymer (III) (i.e., the content of ethylene polymer (IV)/(the content of propylene copolymer (II)+the content of ethylene copolymer (III))) is from 0.25 to 98, preferably from 0.3 to 80, more preferably from 0.4 to 50, and even more preferably from 0.5 to 30. If the ratio exceeds 98 or is less than 0.25, then molded articles may be inferior in tensile elongation at break or impact resistance.

In terms of the appearance and impact resistance of molded articles, the melt flow rate measured at a temperature of 230° C. and a load of 21.18 N of the polyolefin resin composition of the present invention is preferably 3 to 200 g/10 minutes, more preferably 5 to 150 g/10 minutes, and even more preferably 5 to 100 g/10 minutes.

The polyolefin resin composition of the present invention may comprise additional resin or rubber other than the polymer component (I), the polymer component (II), the polymer component (III), and the polymer component (IV), as well as an additive, an inorganic filler, and so on.

Examples of the additional resin or rubber include ABS resin (copolymerized acrylonitrile/butadiene/styrene copolymerized resin), AAS resin (special acrylic rubber/acrylonitrile/styrene resin), ACS resin (acrylonitrile/chlorinated polyethylene/styrene copolymerized resin), polychloroprene, chlorinated rubber, poly(vinyl chloride), poly(vinylidene chloride), fluororesin, polyacetal, polysulfone, polyetheretherketone, and polyethersulfone.

Examples of the additive include neutralizing agents, antioxidants, UV absorbers, antistatic agents, lubricants, nucleating agents, pressure-sensitive adhesives, anticlouding agents, and antiblocking agents.

Examples of the inorganic filler include non-fibrous inorganic fillers and fibrous inorganic fillers.

A non-fibrous inorganic filler refers to an inorganic filler having a shape other than a fibrous shape, such as powder, flake, and granule. Examples thereof include talc, mica, calcium carbonate, barium sulfate, magnesium carbonate, clay, alumina, silica, calcium sulfate, quartz sand, carbon black, titanium oxide, magnesium hydroxide, zeolite, molybdenum sulfide, diatomaceous earth, sericite, SHIRASU (light gray volcanic ash), calcium hydroxide, calcium sulfite, sodium sulfate, bentonite, and graphite. These may be used singly or two or more of them may be used in combination. Among these, the use of talc is preferred.

Although the non-fibrous inorganic filler may be used without applying any treatment before use, it may be used with treating the surface thereof with a silane coupling agent, a titanium coupling agent, or a surfactant in order to improve the interfacial adhesion with a polyolefin resin composition and an ethylene polymer (IV) and in order to improve the dispersibility in the polyolefin resin composition and the ethylene polymer (IV). Examples of the surfactant include higher fatty acids, higher fatty acid esters, higher fatty acid amides and higher fatty acid salts.

The average particle diameter of the non-fibrous inorganic filler is preferably 10 μm or less, and preferably is 5 μm or less. The "average particle diameter" in the present invention means a particle diameter corresponding to a cumulative percentage 50% that is determined from an integral distribution curve of the sub-sieve method produced through measurement conducted with particles being suspended in a dispersing medium, such as water and alcohol, by means of a centrifugal sedimentation type particle size distribution analyzer.

The fibrous inorganic filler refers to an inorganic filler having a fibrous shape. Specific examples thereof include fibrous magnesium oxysulfate, fibrous potassium titanate, fibrous magnesium hydroxide, fibrous aluminum borate, fibrous calcium silicate, fibrous calcium carbonate, carbon fiber, glass fiber, metal fiber, and aromatic polyamide fiber. These may be used singly or two or more of them may be used in combination. Among these, the use of fibrous magnesium oxysulfate or fibrous calcium silicate is preferred, and the use of fibrous magnesium oxysulfate is more preferred.

Although such a fibrous inorganic filler may be used without applying any treatment before use, it also may be used with treating the surface thereof with a silane coupling agent or a metal salt of a higher fatty acid in order to improve the interfacial adhesion with a polyolefin resin composition and an ethylene polymer (IV) and in order to improve the dispersibility in the polyolefin resin composition and the ethylene polymer (IV). Examples of the metal salt of a higher fatty acid include calcium stearate, magnesium stearate, and zinc stearate.

The average fiber length of the fibrous inorganic filler measured by electron microscopic observation is preferably 3 to 20 μm, and more preferably 7 to 15 μm. The aspect ratio is preferably 10 or more, more preferably 10 to 30, and even more preferably 12 to 25. The average fiber diameter measured by electron microscopic observation is preferably 0.2 to 1.5 μm, and more preferably is 0.3 to 1.0 μm. The "aspect ratio" of a fibrous inorganic filler herein refers to the ratio of the average length to the average diameter of the fibrous inorganic filler (i.e., average fiber length/average fiber diameter).

The polyolefin resin composition of the present invention can be prepared by melt-kneading a propylene polymer (I), a propylene copolymer (II), an ethylene copolymer (III), and an ethylene polymer (IV), and the prepared composition may further be molded into a desired shape to form a molded article.

The above-mentioned melt-kneading can be performed by using a conventional method and a conventional machine. For examples, there can be mentioned a method in which a propylene polymer (I), a propylene copolymer (II), an ethylene copolymer and an ethylene polymer (IV) are mixed by using a mixing device, such as a Henschel mixer, a ribbon blender, and a tumble mixer, and then the resulting mixture is melt-kneaded with a kneading apparatus, and a method in which a propylene polymer (I), a propylene copolymer (II), an ethylene copolymer (III), and an ethylene polymer (IV) as well as additives are each fed continuously into a mixing apparatus at fixed proportions by using quantitative feeders to obtain a mixture, and then melt-kneading the mixture by using a single screw extruder, an extruder having two or more screws, a Banbury mixer, a roll type kneading machine, or the like.

The temperature of the system of the above-mentioned melt-kneading is preferably 180° C. or higher, more preferably 180° C. to 300° C., and even more preferably 180° C. to 250° C.

A molded article containing the polyolefin resin composition of the present invention can be obtained by molding the polyolefin resin composition. Preferred is an injection molded article produced by injection molding a polyolefin resin composition. Examples of the mode of injection molding include common injection molding, injection foam molding, supercritical injection foam molding, ultrahigh speed injection molding, injection compression molding, gas-assist injection molding, sandwich molding, sandwich foam molding, and insert/outsert molding.

Examples of the application of the polyolefin resin composition of the present invention include injection molding, extrusion forming, and spinning. Examples of the application of injection molded articles include containers, caps of containers, stationery, toys, miscellaneous daily items, materials for furniture, materials for automobiles, materials for household electric appliances, materials for medical use, and building materials. Examples of the application of extrusion formed articles include containers, packaging materials, stationery, toys, miscellaneous daily items, materials for furniture, films for agriculture, materials for automobiles, materials for medical use, and building materials. Examples of a product obtained by spinning include fiber and materials for medical use.

The molded article of the present invention comprising the polyolefin resin composition of the present invention is usually a molded article reduced in the content of volatile organic compound components and therefore is suitable for a member to be used in a closed space or a member to exist with people. Preferably, the molded article of the present invention is, for example, an automobile material, such as an automotive interior member and a member for an automobile headlamp. The molded article of the present invention is also preferable to be a building material, such as an inner wall of a house and a material for wallpaper. The molded article of the present invention is also preferable to be a material for furniture, such as a wardrobe and a storing container. The molded article of the present invention is also preferable to be a material for a household electric appliance, such as a display of a personal computer, television, etc., an office automation (OA) instrument, a housing material of an air conditioner, a washing machine, an air cleaner, and the like. Moreover, the molded article of the present invention is preferable to be an agricultural film, such as a film for a greenhouse or an agricultural tunnel. Furthermore, the molded article of the present invention is preferable to be a fiber, such as a fiber for clothes, carpets, or sofas.

EXAMPLES

The present invention is illustrated by the following Examples and Comparative Examples. The measurements of the respective items disclosed in the detailed description of the invention, Examples and Comparative Examples were conducted by the following methods.

(1) Contents (Unit: % by Weight) of Propylene Polymer (I) and Propylene Copolymer (II) in the Case of a Polymeric Material Obtained by Producing the Propylene Polymer (I) and the Propylene Copolymer (II) Continuously As to the contents of a propylene polymer (I) and a propylene copolymer (II), the content of the propylene polymer (I) (hereinafter may be indicated by "$P_I$") and the content of the propylene copolymer (II) (hereinafter may be indicated by "$P_{II}$") were calculated from the material balance during the production of the propylene polymer (I) and the propylene copolymer (II).

(2) Content (Unit: % by Weight) of Structural Units Derived from Ethylene of Propylene Copolymer (II)

As to the content of structural units derived from ethylene of the propylene copolymer (II), an IR spectrum of the whole of the propylene polymer (I) and the propylene copolymer (II) was measured, and then the content of structural units derived from ethylene of the propylene polymer (II) was calculated from the following formula (1) in accordance with the method relating to (ii) block copolymer (this corresponds to the polymeric material of the present application) disclosed on page 616 of "Macromolecule Analysis Handbook" (published by Kinokuniya Co., Ltd., 1995), $$E_{II} = (E_T - E_I \times P_I)/P_{II} \qquad \text{Formula (1)}$$

wherein $E_T$, $E_I$, and $E_{II}$ respectively represent the content of structural units derived from ethylene in the whole of the propylene polymer (I) and the propylene copolymer (II), the content of structural units derived from ethylene in the propylene polymer (I), and the content of structural units derived from ethylene in the propylene copolymer (II), and $P_I$ and $P_{II}$ respectively represent the content of the propylene polymer (I) and the content of the propylene copolymer (II).

(3) Content (Unit: % by Weight) of Structural Units Derived from Ethylene of Ethylene Copolymer (III)

The content of structural units derived from ethylene of the ethylene copolymer (III) was determined in accordance with the method disclosed in ASTM D5017-96.

(4) Intrinsic Viscosity ([η], unit: dL/g)

Intrinsic viscosity was measured in 135° C. Tetralin using an Ubbelohde viscometer.

(4-1) Intrinsic Viscosities ([η]$_I$, [η]$_{II}$) of Propylene Polymer (I) and Propylene Copolymer (II)

The intrinsic viscosity of the propylene polymer (I) (this intrinsic viscosity is hereinafter indicated by [η]$_I$) was determined by directly measuring the propylene polymer (I) sampled after the completion of the polymerization of the first step. On the other hand, the intrinsic viscosity of the propylene copolymer (II) (this intrinsic viscosity is indicated by [η]$_{II}$) was calculated from the formula (2) given below using the measured intrinsic viscosity [η]$_I$ of the propylene polymer (I), the intrinsic viscosity of the whole polymeric material composed of the propylene polymer (I) and the propylene copolymer (II) resulting after the completion of the polymerization of the second step (this intrinsic viscosity is indicated by [η]$_T$), the content of the propylene polymer (I) (this content is indicated by $P_I$), and the content of the propylene copolymer (II) (this content is indicated by $P_{II}$).

$$[\eta]_I \times P_I/100 + [\eta]_{II} \times P_{II}/100 = [\eta]_T \quad \text{Formula (2)}$$

(5) Melt Flow Rate (MFR, Unit: g/10 Minutes)

Melt flow rate was measured in accordance with JIS K7210. The melt flow rate of a polyolefin resin composition was measured at a temperature of 230° C. and a load of 21.18 N. The melt flow rates of the ethylene copolymer (III) and the ethylene polymer (IV) were measured at a temperature of 190° C. and a load of 21.18 N.

(6) Tensile Elongation at Break (Unit: %)

Tensile elongation at break was measured under the following conditions.

Measurement temperature: 23° C.
Sample shape: JIS No. 1 small dumbbell (2 mm thick)
Tensile speed: 50 mm/min (7) IZOD Impact Strength (Unit: kJ/m$^2$)

IZOD impact strength was measured under the following conditions.

Measurement temperature: 23° C.
Sample shape: 10 mm×65 mm (4 mm thick) [with a V notch]

(8) Appearance Evaluation

In appearance evaluation, the case that the injection molded article observed had almost no striped flow mark was judged to be "good" and the case that such a failure was found remarkably was judged to be "bad."

(9) Fogging Test (Unit: mg)

A fogging test of a polyolefin resin composition produced by the method of the present invention was carried out under the following conditions. A polyolefin resin composition prepared by performing heat melt kneading using a kneading machine was used as a sample. The weight of an organic compound adhering to a glass surface was determined from the change in weight of the glass plate before and after the test. A larger weight of the organic compound adhering to the glass surface indicates that a larger amount of volatile organic compound component is present in the composition.

Measuring instrument: Window screen fogging tester, Model WF-2, manufactured by Suga Test Instruments Co., Ltd.

Heating condition: 120° C. (air type)
Heating time: 20 hours
Cooling condition: 25° C.
Sample weight: 5 g Example 1

A propylene copolymeric material (BCPP1) was obtained by producing a propylene homopolymer having an intrinsic viscosity of 0.80 dL/g (propylene polymer (I)) in a gas phase using a Ziegler-Natta catalyst in a first step, and subsequently producing a copolymer of propylene and ethylene having an intrinsic viscosity of 7.00 dL/g and a content of structural units derived from ethylene of 32% by weight (propylene copolymer (II)) in a gas phase in a second step. The content of the copolymer of propylene and ethylene (propylene copolymer (II)) was 12% by weight.

75% by weight of the resulting propylene copolymeric material (BCPP1) and 25% by weight of Highzex 1300J (produced by Prime Polymer Co., Ltd., density=961 kg/m$^3$, MFR=12 g/10 minutes) as a high density polyethylene (ethylene polymer (IV)) were mixed uniformly and then heated, melted and kneaded in a twin screw kneading machine having an inner diameter of 15 mm (KZW15-45MG manufactured by Technovel Corp., inner diameter=15 mm, L/D=45) at a preset temperature of 220° C. and a screw rotation speed of 500 rpm, affording a polyolefin resin composition having an MFR of 36 g/10 minutes.

The resulting polyolefin resin composition was injection molded at a molding temperature of 220° C. and a mold cooling temperature of 50° C. by using an injection molding machine, model Si-30III, manufactured by Toyo Machinery & Metal Co., Ltd., affording a specimen, which was an injection molded article. Properties of the resulting specimen are shown in Table 2.

Comparative Example 1

A melt-kneaded material having an MFR of 34 g/10 minutes was obtained by the same method as Example 1 except for failing to use the propylene copolymeric material (BCPP1) and using 100% by weight of KEIYO Polyethylene M6910 (produced by Keiyo Polyethylene Co., Ltd., density=958 kg/m$^3$, MFR=23 g/10 minutes) as a high density polyethylene (ethylene polymer (IV)).

The resulting melt-kneaded material was injection molded in the same manner as Example 1, affording a specimen, which was an injection molded article. Properties of the resulting specimen are shown in Table 2.

Comparative Example 2

A polyolefin resin composition having an MFR of 61 g/10 minutes was obtained by the same method as Example 1 except for failing to use the high density polyethylene (ethylene polymer (IV)) and using 100% by weight of the propylene copolymeric material (BCPP1).

The resulting polyolefin resin composition was injection molded in the same manner as Example 1, affording a specimen, which was an injection molded article. Properties of the resulting specimen are shown in Table 2.

Comparative Example 3

A polyolefin resin composition having an MFR of 35 g/10 minutes was obtained by the same method as Example 1 except for using 5% by weight of the propylene copolymeric material (BCPP1) and 95% by weight of KEIYO Polyethylene M6910 (produced by Keiyo Polyethylene Co., Ltd., density=958 kg/m$^3$, MFR=23 g/10 minutes) as a high density polyethylene (ethylene polymer (IV)).

The resulting polyolefin resin composition was injection molded in the same manner as Example 1, affording a specimen, which was an injection molded article. Properties of the resulting specimen are shown in Table 2.

Comparative Example 4

A polyolefin resin composition having an MFR of 59 g/10 minutes was obtained by the same method as Example 1 except for using 99% by weight of the propylene copolymeric material (BCPP1) and 1% by weight of the high density polyethylene.

The resulting polyolefin resin composition was injection molded in the same manner as Example 1, affording a specimen, which was an injection molded article. Properties of the resulting specimen are shown in Table 2.

TABLE 1

| | Polymer (I) | Polymer (II) | | |
|---|---|---|---|---|
| | $[\eta]_I$ (dL/g) | $[\eta]_{II}$ (dL/g) | $E_{II}$ (% by weight) | $P_{II}$ (% by weight) |
| BCPP1 | 0.80 | 7.00 | 32 | 12 |

TABLE 2

| | Example | Comparative Example | | | |
|---|---|---|---|---|---|
| | 1 | 1 | 2 | 3 | 4 |
| Polymer (I) (% by weight) | 66 | — | 88 | 4.4 | 87 |
| Polymer (II) (% by weight) | 9 | — | 12 | 0.6 | 12 |
| Polymer (III) (% by weight) | — | — | — | — | — |
| Polymer (IV) (% by weight) | 25 | 100 | — | 95 | 1 |
| Polymer (IV)/(Polymer (II) + Polymer (III)) | 2.8 | — | 0 | 158 | 0.08 |
| Talc (% by weight) | — | — | — | — | — |
| MFR (g/10 minutes) | 36 | 34 | 61 | 35 | 59 |
| Tensile elongation at break (%) | 1225 | 1078 | 277 | 593 | 1090 |
| IZOD (kJ/m$^2$) | 6.4 | 2.6 | 3.6 | 2.2 | 4.7 |
| Fogging test (mg) | 2.4 | 1.8 | 4.9 | 2.6 | 4.9 |
| Appearance | Good | Good | Good | Good | Good |

Example 2

A polyolefin resin composition having an MFR of 21 g/10 minutes was obtained by uniformly mixing 16% by weight of a propylene copolymeric material (BCPP1), 49% by weight of KEIYO Polyethylene M6910 (produced by Keiyo Polyethylene Co., Ltd., density=958 kg/m$^3$, MFR=23 g110 minutes) as a high density polyethylene (ethylene polymer (IV)), 15% by weight of Engagement 8200 (ethylene-octene copolymer, produced by The Dow Chemical Company, MFR (at 190° C.)=5 g/10 minutes, content of structural units derived from ethylene=63% by weight, density=870 kg/m$^3$), and 20% by weight of talc (weight average particle diameter=4.6 μm) and then heating, melting, and kneading them in a twin screw kneading machine having an inner diameter of 15 mm (KZW15-45MG manufactured by Technovel Corp., inner diameter=15 mm, L/D=45) at a preset temperature of 220° C. and a screw rotation speed of 500 rpm.

The resulting polyolefin resin composition was injection molded in the same manner as Example 1, affording a specimen, which was an injection molded article. Properties of the resulting specimen are shown in Table 3.

Example 3

A polyolefin resin composition having an MFR of 21 g/10 minutes was obtained by the same method as Example 1 except for using 32.5% by weight of the propylene copolymeric material (BCPP1) and 32.5% by weight of the high density polyethylene (ethylene polymer (IV)).

The resulting polyolefin resin composition was injection molded in the same manner as Example 1, affording a specimen, which was an injection molded article. Properties of the resulting specimen are shown in Table 3.

Example 4

A polyolefin resin composition having an MFR of 19 g/10 minutes was obtained by the same method as Example 3 except for using Highzex 1300J (produced by Prime Polymer Co., Ltd., density=961 kg/m$^3$, MFR=12 g/10 minutes) as a high density polyethylene (ethylene polymer (IV)).

The resulting polyolefin resin composition was injection molded in the same manner as Example 1, affording a specimen, which was an injection molded article. Properties of the resulting specimen are shown in Table 2.

Comparative Example 5

A polyolefin resin composition having an MFR of 24 g/10 minutes was obtained by the same method as Example 2 except for failing to use the propylene copolymeric material (BCPP1) and using 65% by weight of the high density polyethylene (ethylene polymer (IV)).

The resulting polyolefin resin composition was injection molded in the same manner as Example 1, affording a specimen, which was an injection molded article. Properties of the resulting specimen are shown in Table 3.

Comparative Example 6

A polyolefin resin composition having an MFR of 25 g/10 minutes was obtained by the same method as Example 2 except for using 65% by weight of the propylene copolymeric material (BCPP1) and failing to use the high density polyethylene (ethylene polymer (IV)).

The resulting polyolefin resin composition was injection molded in the same manner as Example 1, affording a specimen, which was an injection molded article. Properties of the resulting specimen are shown in Table 3.

TABLE 3

|  | Example | | | Comparative Example | |
|---|---|---|---|---|---|
|  | 2 | 3 | 4 | 5 | 6 |
| Polymer (I) (% by weight) | 14 | 28.5 | 28.5 | — | 57 |
| Polymer (II) (% by weight) | 2 | 4 | 4 | — | 8 |
| Polymer (III) (% by weight) | 15 | 15 | 15 | 15 | 15 |
| Polymer (IV) (% by weight) | 49 | 32.5 | 32.5 | 65 | — |
| Polymer (IV)/(Polymer (II) + Polymer (III)) | 2.9 | 1.7 | 1.7 | 4.3 | 0 |
| Talc (% by weight) | 20 | 20 | 20 | 20 | 20 |
| MFR (g/10 minutes) | 21 | 21 | 19 | 24 | 25 |
| Tensile elongation at break (%) | 1137 | 1178 | 1415 | 1092 | 132 |
| IZOD (kJ/m$^2$) | 19 | 32 | 40 | 5.8 | 16 |
| Fogging test (mg) | 1.9 | 2.9 | 2.6 | 1.6 | 3.7 |
| Appearance | Good | Good | Good | Good | Good |

What is claimed is:

1. A polyolefin resin composition comprising:
not less than 1% by weight and less than 80% by weight of a propylene polymer (I) defined below,
not less than 1% by weight and less than 80% by weight of a propylene copolymer (II) defined below and/or an ethylene copolymer (III) defined below, and
more than 20% by weight and not more than 98% by weight of an ethylene polymer (IV) defined below,
wherein a ratio of the content of the ethylene polymer (IV) to the sum total of the contents of the propylene copolymer (II) and the ethylene copolymer (III) is within a range of from 0.25 to 98 with the proviso that the combined amount of the propylene polymer (I), the propylene copolymer (II), the ethylene copolymer (III) and the ethylene polymer (IV) is taken as 100% by weight,
wherein the propylene polymer (I) is a propylene homopolymer or a copolymer of propylene and at least one comonomer selected from the group consisting of ethylene and α-olefins having 4 to 10 carbon atoms, the copolymer having more than 0% by weight and less than 20% by weight of structural units derived from the at least one comonomer, with the proviso that the overall weight of the polymer (I) is taken as 100% by weight,
wherein the propylene copolymer (II) is a copolymer of propylene and at least one comonomer selected from the group consisting of ethylene and α-olefins having 4 to 10 carbon atoms, the copolymer having 20 to 80% by weight of structural units derived from the comonomer with the proviso that the overall weight of the copolymer (II) is taken as 100% by weight,
wherein the ethylene copolymer (III) is a copolymer of ethylene and an α-olefin having 4 to 10 carbon atoms, the copolymer having a density of less than 940 kg/m$^3$, and
wherein the ethylene polymer (IV) is a polyethylene having a melt flow rate measured at 190° C. and a load of 21.18 N of 12 to 100 g/10 minutes and a density of 940 to 970 kg/m$^3$, excluding an ethylene-propylene copolymer.

2. The polyolefin resin composition according to claim 1, wherein the propylene polymer (I) and the propylene copolymer (II) are as a whole a polymeric material produced via multi-stage polymerization by which the propylene polymer (I) is produced first and then the propylene copolymer (II) is produced.

3. A molded article comprising the polyolefin resin composition according to claim 1.

4. A molded article produced by injection molding the polyolefin resin composition according to claim 1.

* * * * *